(12) United States Patent
Hansen et al.

(10) Patent No.: US 11,523,888 B2
(45) Date of Patent: Dec. 13, 2022

(54) CERAMIC DENTAL RESTORATIONS MADE BY ADDITIVE MANUFACTURING

(71) Applicant: 3M INNOVATIVE PROPERTIES COMPANY, St. Paul, MN (US)

(72) Inventors: James D. Hansen, White Bear Lake, MN (US); Joseph C. Dingeldein, Blaine, MN (US); Gareth A. Hughes, St. Paul, MN (US); Gopal B. Haregoppa, Woodbury, MN (US); Bastian P. Kirchner, Fürstenfeldbruck (DE); Till Meurer, Bonn (DE); Holger Hauptmann, Sindelsdorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 335 days.

(21) Appl. No.: 16/583,548

(22) Filed: Sep. 26, 2019

(65) Prior Publication Data

US 2020/0015945 A1    Jan. 16, 2020

Related U.S. Application Data

(62) Division of application No. 15/288,008, filed on Oct. 7, 2016, now abandoned.

(51) Int. Cl.
*A61C 13/00* (2006.01)

(52) U.S. Cl.
CPC ...... *A61C 13/0019* (2013.01); *A61C 13/0004* (2013.01); *A61C 13/0013* (2013.01)

(58) Field of Classification Search
CPC ... A61C 13/0004; A61C 13/0019; A61C 5/70; A61C 5/73; A61C 5/77; B33Y 80/00
See application file for complete search history.

(56) References Cited

U.S. PATENT DOCUMENTS

| | | | | |
|---|---|---|---|---|
| 1,609,550 A | * | 12/1926 | Jaques, Jr. | A61C 5/70 433/218 |
| D139,447 S | * | 11/1944 | Brubaker | D24/156 |
| 3,120,704 A | * | 2/1964 | Newcomb | A61D 5/00 433/1 |
| 3,457,644 A | * | 7/1969 | Susman | A61C 13/26 433/213 |
| 3,565,387 A | * | 2/1971 | Neustadter | A61C 5/77 264/16 |
| 4,015,332 A | * | 4/1977 | Manne | A61C 5/30 433/219 |
| 4,206,545 A | | 6/1980 | Lord | |

(Continued)

FOREIGN PATENT DOCUMENTS

| | | |
|---|---|---|
| CA | 2671064 | 1/2011 |
| CN | 1359661 | 7/2002 |

(Continued)

*Primary Examiner* — Jacob J Cigna (57) ABSTRACT

An additively manufactured dental crown with a wall having a bottom edge and an occlusal portion joined with the wall opposite the bottom edge. The wall and occlusal portion form an interior surface and an opposing exterior surface. By using additive manufacturing and materials for such, the dental crown can have thin walls with a thickness of less than 300 microns at the thinnest portion of it and can include fine printed features such as identifiers, internal ribs, slots, porous meshes, and retention elements.

16 Claims, 6 Drawing Sheets

(56) References Cited

U.S. PATENT DOCUMENTS

| | | | |
|---|---|---|---|
| 4,332,564 A | 6/1982 | Lord | |
| 4,398,887 A | 8/1983 | Balde et al. | |
| 4,403,960 A * | 9/1983 | Hauri | A61C 13/10 433/177 |
| 4,431,416 A | 2/1984 | Niznick | |
| 4,504,230 A | 3/1985 | Patch | |
| 4,668,193 A | 5/1987 | Burgess et al. | |
| 4,678,435 A | 7/1987 | Long | |
| 4,722,689 A | 2/1988 | Corbett | |
| 4,778,386 A * | 10/1988 | Spiry | A61C 13/0001 433/45 |
| 4,957,438 A | 9/1990 | Bax | |
| 5,098,295 A | 3/1992 | Durr et al. | |
| 5,120,223 A | 6/1992 | Weissman | |
| 5,266,032 A | 11/1993 | Obersat | |
| 5,314,335 A | 5/1994 | Fung | |
| 5,458,489 A | 10/1995 | Tennyson | |
| 5,487,663 A | 1/1996 | Wilson | |
| 5,538,429 A | 7/1996 | Mayclin | |
| 5,624,261 A | 4/1997 | Wiedenfeld | |
| 6,068,481 A | 5/2000 | Worthington | |
| 6,106,295 A | 8/2000 | Wilson | |
| 6,592,373 B2 | 7/2003 | Zilberman | |
| 6,799,969 B2 | 10/2004 | Sun et al. | |
| 6,884,073 B2 | 4/2005 | Chilibeck | |
| 6,935,862 B2 | 8/2005 | Harlan | |
| 7,605,817 B2 | 10/2009 | Zhang et al. | |
| 7,956,862 B2 | 6/2011 | Zhang et al. | |
| D662,594 S * | 6/2012 | Hansen | D24/156 |
| 8,235,722 B2 | 8/2012 | Pfeiffer et al. | |
| 8,359,114 B2 | 1/2013 | Steingart et al. | |
| 8,419,431 B2 | 4/2013 | Huynh | |
| 8,844,139 B2 | 9/2014 | Johnson et al. | |
| 2002/0086266 A1 | 7/2002 | Karmaker et al. | |
| 2002/0150864 A1 | 10/2002 | Zilberman | |
| 2003/0039943 A1 | 2/2003 | Worthington | |
| 2003/0064170 A1 | 4/2003 | Ito | |
| 2003/0114553 A1 | 6/2003 | Karim et al. | |
| 2003/0194681 A1 | 10/2003 | Stoller et al. | |
| 2003/0203339 A1 | 10/2003 | Chilibeck | |
| 2004/0126743 A1 | 7/2004 | Mayclin et al. | |
| 2004/0161726 A1 | 8/2004 | Saito et al. | |
| 2005/0042576 A1 | 2/2005 | Oxman et al. | |
| 2005/0084823 A1 | 4/2005 | Foser et al. | |
| 2005/0244770 A1 * | 11/2005 | Worthington | A61C 5/77 433/215 |
| 2005/0250072 A1 | 11/2005 | Laux | |
| 2006/0099549 A1 | 5/2006 | Engman | |
| 2006/0154211 A1 | 7/2006 | Bybee et al. | |
| 2007/0196792 A1 | 8/2007 | Johnson et al. | |
| 2007/0254265 A1 | 11/2007 | Callan | |
| 2007/0264612 A1 | 11/2007 | Mount | |
| 2007/0264615 A1 | 11/2007 | Ruppert et al. | |
| 2007/0270691 A1 | 11/2007 | Bailey et al. | |
| 2007/0290385 A1 | 12/2007 | Holzner et al. | |
| 2008/0293013 A1 | 11/2008 | Lussi et al. | |
| 2009/0197218 A1 | 8/2009 | Wiener | |
| 2010/0003641 A1 | 1/2010 | Hansen et al. | |
| 2010/0028835 A1 | 2/2010 | Hansen et al. | |
| 2010/0145393 A1 | 6/2010 | Fallin et al. | |
| 2010/0159417 A1 | 6/2010 | Whipple | |
| 2010/0203480 A1 | 8/2010 | Schweitzer et al. | |
| 2010/0244294 A1 | 9/2010 | Karim et al. | |
| 2011/0117524 A1 | 5/2011 | McDonald et al. | |
| 2011/0171599 A1 | 7/2011 | Seo et al. | |
| 2011/0207087 A1 | 8/2011 | Jones et al. | |
| 2011/0244425 A1 | 10/2011 | Wiener | |
| 2012/0003606 A1 | 1/2012 | Fischler et al. | |
| 2012/0077149 A1 | 3/2012 | Ospelt et al. | |
| 2012/0078206 A1 | 3/2012 | Park | |
| 2012/0100501 A1 * | 4/2012 | Huynh | A61C 5/77 433/172 |
| 2012/0100504 A1 | 4/2012 | Huynh | |
| 2012/0100505 A1 | 4/2012 | Huynh | |
| 2012/0214129 A1 | 8/2012 | Laux | |
| 2012/0308837 A1 | 12/2012 | Schlechtriemen et al. | |
| 2013/0018011 A1 | 1/2013 | Javanbakht et al. | |
| 2013/0137064 A1 | 5/2013 | Velamakanni et al. | |
| 2013/0137065 A1 | 5/2013 | Velamakanni et al. | |
| 2013/0149672 A1 | 6/2013 | Monkmeyer | |
| 2013/0171589 A1 | 7/2013 | Velamakanni et al. | |
| 2013/0224688 A1 | 8/2013 | Mayr | |
| 2014/0113250 A1 | 4/2014 | Beveridge | |
| 2014/0113251 A1 | 4/2014 | Schweiger et al. | |
| 2014/0295379 A1 | 10/2014 | Monkmeyer | |
| 2015/0111172 A1 | 4/2015 | Jung | |
| 2016/0022378 A1 | 1/2016 | Hansen et al. | |
| 2016/0206403 A1 * | 7/2016 | Ouellette | A61C 5/77 |
| 2017/0007368 A1 * | 1/2017 | Boronkay | B33Y 50/02 |
| 2017/0056138 A1 | 3/2017 | Zandinejad | |

FOREIGN PATENT DOCUMENTS

| | | | |
|---|---|---|---|
| CN | 203042519 | 7/2013 | |
| CN | 203815621 | 9/2014 | |
| CN | 203943751 | 11/2014 | |
| CN | 105164084 A * | 12/2015 | A61C 13/0022 |
| DE | 2837720 | 3/1980 | |
| DE | 3435918 | 4/1986 | |
| DE | 3514591 | 10/1986 | |
| DE | 3604059 | 8/1987 | |
| DE | 3711207 | 10/1988 | |
| DE | 4201262 | 7/1993 | |
| DE | 9306006 | 9/1993 | |
| DE | 4313122 | 10/1994 | |
| DE | 4418130 | 12/1994 | |
| DE | 29603809 | 10/1996 | |
| DE | 19627597 | 9/1997 | |
| DE | 19635357 | 2/1998 | |
| DE | 19812178 | 8/1999 | |
| DE | 29919348 | 12/1999 | |
| DE | 102004008314 | 9/2005 | |
| DE | 102011103027 | 5/2012 | |
| DE | 102013021617 | 5/2015 | |
| EP | 1138272 | 10/2001 | |
| GB | 1013168 | 12/1965 | |
| GB | 2033822 | 5/1980 | |
| GB | 2205505 | 12/1988 | |
| JP | H06-225890 | 8/1994 | |
| KR | 101183078 | 9/2012 | |
| KR | 2013-0047003 | 5/2013 | |
| KR | 2014-0007508 | 1/2014 | |
| MX | 2012005572 | 11/2013 | |
| RU | 2233907 | 8/2004 | |
| RU | 131600 | 8/2013 | |
| RU | 2554215 | 6/2015 | |
| SU | 931181 | 5/1982 | |
| SU | 1699449 | 12/1991 | |
| TW | M419552 | 1/2012 | |
| TW | M501836 | 6/2015 | |
| WO | WO 85/01434 | 4/1985 | |
| WO | WO 90/09766 | 9/1990 | |
| WO | WO 96/29019 | 9/1996 | |
| WO | WO 00/66026 | 11/2000 | |
| WO | WO 01/10332 | 2/2001 | |
| WO | WO 01/70125 | 9/2001 | |
| WO | WO 02/083022 | 10/2002 | |
| WO | WO 2005/051517 | 6/2005 | |
| WO | WO 2006/076413 | 7/2006 | |
| WO | WO 2006/119003 | 11/2006 | |
| WO | WO 2008/033758 | 3/2008 | |
| WO | WO 2008/033893 | 3/2008 | |
| WO | WO 2010/019677 | 2/2010 | |
| WO | WO 2011/017113 | 2/2011 | |
| WO | WO 2011/126200 | 10/2011 | |
| WO | WO 2012/115623 | 8/2012 | |
| WO | WO 2012/134449 | 10/2012 | |
| WO | WO 2014/095033 | 6/2014 | |
| WO | WO 2014/137735 | 9/2014 | |
| WO | WO 2015/037788 | 3/2015 | |
| WO | WO 2015/088976 | 6/2015 | |

(56) References Cited

FOREIGN PATENT DOCUMENTS

WO    WO 2016/077250     5/2016
WO    WO 2016/140840     9/2016

* cited by examiner

CERAMIC DENTAL RESTORATIONS MADE BY ADDITIVE MANUFACTURING

BACKGROUND

Ceramics, such as zirconia, are the gold standard for permanent aesthetic dental restorations such as crowns, bridges, inlays, onlays, veneers, and pontics. These materials demonstrate high strength and, in the case of zirconia, can be engineered to undergo transformation toughening to reduce the risk of brittle fracture. Because the materials have low ductility and high hardness, the shape of the restoration is typically custom created to precisely match the dentition of the individual patient. This process often involves capturing the geometry of prepared tooth and subsequently designing and fabricating the restoration either at a dental laboratory or with in-office computer-aided manufacturing equipment. This process is expensive and time consuming for both the dentist and patient.

Preformed dental crowns are manufactured in a factory, shipped in kits to dentists, and can be shaped and adapted chairside to create custom dental restoration. Stainless steel and aluminum have been the favored material because they are strong, yet malleable. Thin wall stainless steel crowns, having a wall thickness of 150-200 microns, can be mass produced at low cost, require minimal removal of tooth structure, and can be trimmed and bent by the dentist at chair side to create a tight fitting and durable restoration. Unfortunately, the tooth-like aesthetics are not possible with stainless steel and attempts to substitute polymers, like polycarbonate, have yielded crowns with durability substantially less than ceramic or steel crowns.

Polymer-ceramic composites are alternative material for restoring teeth. These materials may be pre-shaped in a dental laboratory or delivered to the dentist in a form that allows shaping and curing of the restoration in the mouth of the patient. The cured form of these materials offers lower strength than native tooth enamel, but the incorporation of high amounts of ceramic filler can result in restorations that exhibit wear resistance comparable to natural tooth structure.

To date the availability of preformed ceramic dental restorations has been limited to a few preformed crowns have been offered for pediatric use. Those crowns typically have a wall thickness in excess of 0.4 mm and, therefore, require extensive preparation of the tooth prior to fitting. Further as zirconia is a very hard and tough material, they are not easily trimmed or otherwise adjusted at the dental chair. Accordingly, a need exists for new types of ceramic crowns, or other dental restorations, and ways to make such crowns.

SUMMARY

An additively manufactured dental crown, consistent with the present invention, includes a wall having a bottom edge and an occlusal portion joined with the wall opposite the bottom edge, where the wall and occlusal portion form an interior surface and an opposing exterior surface. A thinnest portion of the wall has a thickness of less than 300 microns, and the wall and occlusal portion both comprise an additively manufacturable material.

A method for making a dental crown, consistent with the present invention, includes receiving a design for a dental crown and making the dental crown using additive manufacturing. The dental crown has a wall having a bottom edge and an occlusal portion joined with the wall opposite the bottom edge, where the wall and occlusal portion form an interior surface and an opposing exterior surface. The wall has a thickness of less than 300 microns at the thinnest portion of it.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention include ceramic dental restorations exhibiting unique physical features and performance characteristics made by additive manufacturing. These features can enhance the function and ease-of-use of ceramic dental restorations, including integral retention, identification, adjustability, flexibility, and tailored porosity. Creation of these features is enabled by additive manufacturing, and examples of such features include the following: thin walls and engineered wall sections; integrally printed branding, sizing, and lot identification information; integral retentive features; slotted and mesh structures; self-reinforcing spaced-apart walls; and selectively trimmable walls.

These features can enable, for example, the following functions: minimal tooth preparation required to accommodate a crown; enhanced trimmability and adaptability; retention of cement and retention onto a tooth stump; increased potential to release actives through engineered pores (e.g., fluoride); increased flexibility with self-reinforcement; and chairside adaption of a stock crown to multiple shapes.

System and Method

Figure 1:
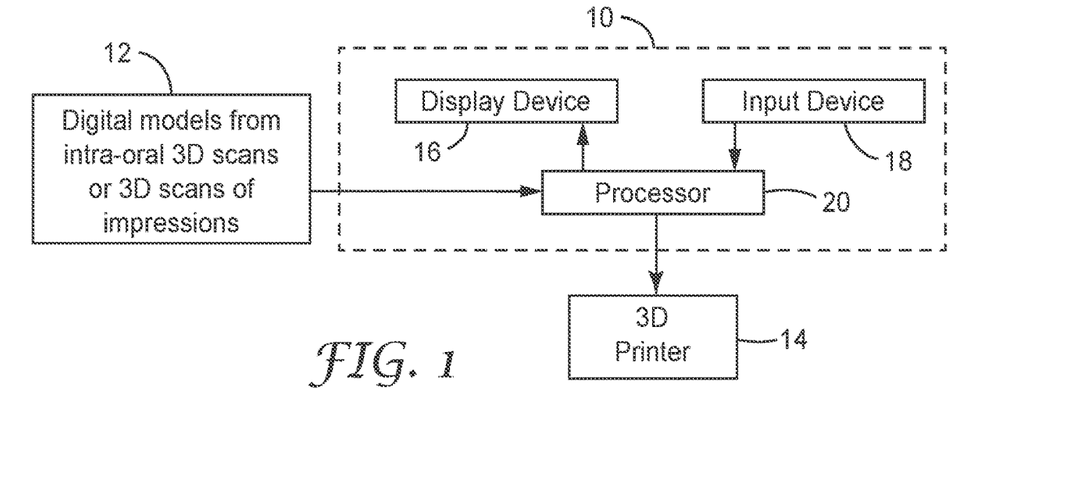
FIG. 1 is a diagram of a system for making dental restorations using additive manufacturing.

FIG. 1 is a diagram of a system 10 for generating additively manufactured 3D dental restorations, such as crowns, possibly using digital 3D models from intra-oral scans. System 10 includes a processor 20 receiving digital 3D models of teeth or other intra-oral structures (12) from intra-oral 3D scans or scans of impressions or castings of teeth. System 10 can also include an electronic display device 16 for displaying digital 3D models from scans of intra-oral structures or models of designed dental restorations such as crowns, and an input device 18 for receiving user commands or other information, for example to design dental restorations. Systems to generate digital 3D images or models based upon image sets from multiple views are disclosed in U.S. Pat. Nos. 7,956,862 and 7,605,817, both of which are incorporated herein by reference as if fully set forth. These systems can use an intra-oral scanner to obtain digital images from multiple views of teeth or other intra-oral structures, and those digital images are processed to generate a digital 3D model or scan representing the scanned teeth or other intra-oral structure. The 3D models or scans can be implemented as, for example, a polygonal mesh or point cloud representing the surface of the scanned object or intra-oral structure. System 10 also includes a 3D printer 14, or other additive manufacturing device, to make the dental restorations.

System 10 can be implemented with, for example, a desktop, notebook, or tablet computer. System 10 can receive the 3D scans locally or remotely via a network. Display device 16 can be implemented with any electronic display, for example a Cathode Ray Tube (CRT), a liquid crystal display (LCD), light emitting diode (LED) display, or organic light emitting diode (OLED) display. Input device 18 can be implemented with any device for entering information or commands, for example a keyboard, microphone, cursor-control device, or touch screen. The components of system 10 may also be combined, e.g., a tablet computer can incorporate the processor, display and touch screen input devices into a single unit.

Figure 2:
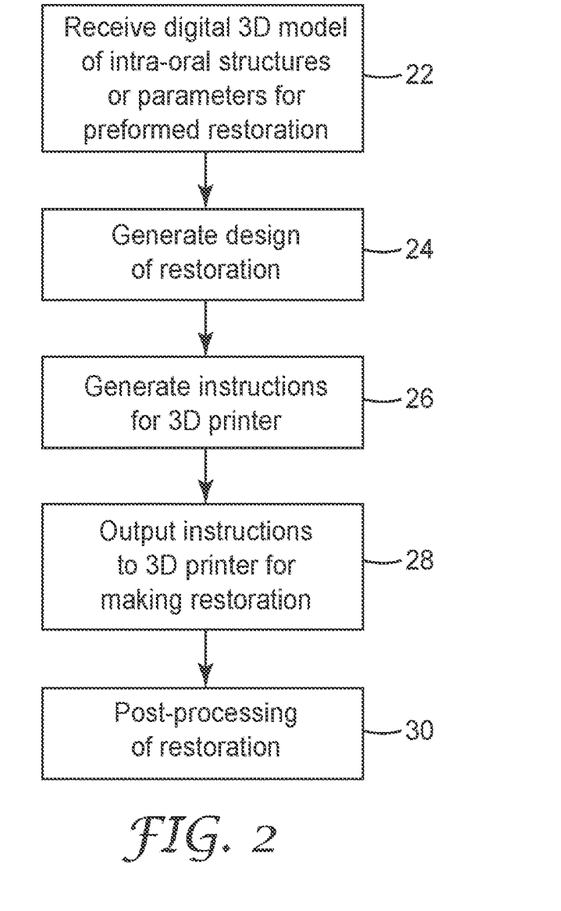
FIG. 2 is a flow chart of a method for making dental restorations using additive manufacturing.

FIG. 2 is a flow chart representing a method for making dental restorations, such as crowns, using additive manufacturing. This method includes receiving digital 3D models of intra-oral structures, such as models 12, or parameters for a preformed restoration (step 22), generating a design of the restoration (step 24), generating instructions for a 3D printer to make the restoration (step 26), outputting the instructions to the 3D printer for making the restoration (step 28), and possibly performing post-processing of the 3D printed restoration (step 30). Some steps of this method, such as steps 22, 24, 26, and 28, can be implemented in software or firmware modules for execution by a processor such as processor 20, and the method can possibly be implemented using cloud computing. The designed restoration can be displayed on a display device such as display device 16, and a user may interact with the designed restoration via display device 16 and input device 18.

Step 24 to design the restoration to be 3D printed can be implemented with software applications, including those for computer-aided design (CAD) and finite element analysis (FEA). Examples of CAD applications to design restorations, either standard or patient-specific or both, include the software products from SOLIDWORKS Corp. (Waltham, Mass.), Dental Wings Inc. (Montreal, Canada), and Exocad GmbH (Darmstadt, Germany). Non dental-specific CAD design software may be used as well, especially when designing standard preformed crown shapes, including the Unigraphics product from Siemens PLM Software (Plano, Tex.), the products from SOLIDWORKS Corp., and the Pro/ENGINEER product from PTC (Needham, Mass.). Stress analysis via FEA or modeling can be used to predict performance, such as stress and deflection, during the design, and an example of an FEA application is the software product from ANSYS, Inc. (Canonsburg, Pa.). Generative design software can be used to optimize the structure of the restoration for desired response (e.g., flexibility, feature size, location, and volume) under simulated use conditions, and an example of such software application is the AUTODESK Within product from Autodesk Inc. (San Rafael, Calif.).

Steps 26 and 28 can use software applications to convert the designed restoration into instructions, for example a stereolithography (STL) file, for a 3D printer or other additive manufacturing device. The instructions can include slicing the design into layers to additively build up the restoration possibly with supporting layers. An example of 3D printing is the vat polymerization method using the Pico 3D printer from Asiga (Sydney, Australia). Other types of additive manufacturing to form a gel body or ceramic body include the following: inkjet printing; powderbed printing; selective laser sintering; fuse deposition modeling; and laminated object manufacturing. Examples of materials and processes for additive manufacturing, including 3D printable materials, are disclosed in the following: PCT Application No. US2016/032986, entitled "Additive Manufacturing Process for Producing Ceramic Articles Using a Sol Containing Nano-Sized Particles," and filed May 18, 2016; PCT Application No. US2016/034273, entitled "Sol Containing Nano Zirconia Particles for Use in Additive Manufacturing Processes for the Production of 3-Dimensional Articles," and filed May 26, 2016; PCT Application No. US2016/041747, entitled "A Method of Making a Dental Article," and filed Jul. 11, 2016; and PCT Application Publication No. 2016/140840.

The post-processing for step 30 can include post-curing, support removal, extraction, and/or burn out, and then sintering and finishing of the 3D printed restoration.

This method for 3D printing of zirconia, or other additively manufacturable material, can create geometric features in crowns, or other dental restorations, unattainable with milling methods, and examples of those types of engineered features are described below.

Efficient Production of Thin Walled Crowns

Wall thickness of milled zirconia is limited by the low strength and subsequent chipping of the pre-sintered forms. Even when thin walls are attainable, productivity is compromised as mill speed must be reduced to accommodate the low strength of partially sintered blanks. The milling process is also not favorable as demand increases since each part surface must be individually machined, resulting in limited economies of scale for the lab or factory milling the blanks.

In comparison, the crowns shown in FIGS. 3-5 were additively manufactured in the zirconia sol process and subsequently densified, yielding a 250 micron wall thickness. The 3D printing process is highly scalable, with commercial units now available capable of printing over 100 crowns simultaneously in a factory environment. Two of these crowns were cemented to tooth preparation surrogates and cycled against a tooth surrogate at increasing loads in a chewing simulation. Failure occurred at 200 N and 205 N when the tooth preparations failed. No damage was evident on the zirconia crowns.

Figure 3:
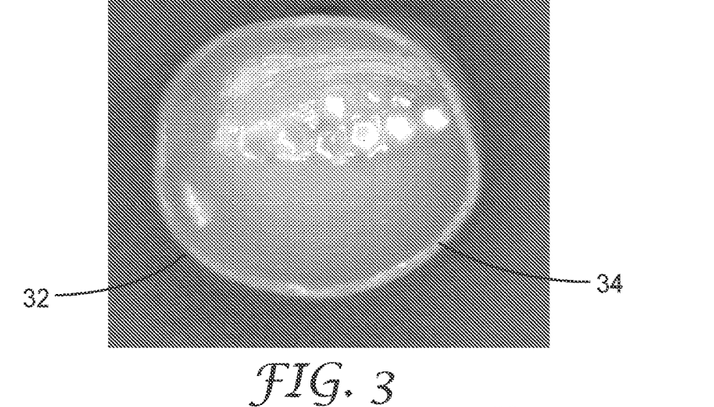
FIG. 3 is a first view of an image of a thin wall 3D printed zirconia crown.
Figure 4:
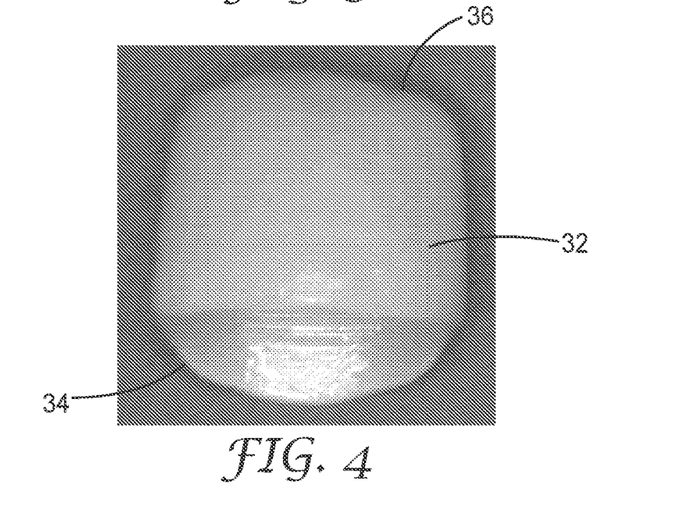
FIG. 4 is a second view of an image of a thin wall 3D printed zirconia crown.
Figure 5:
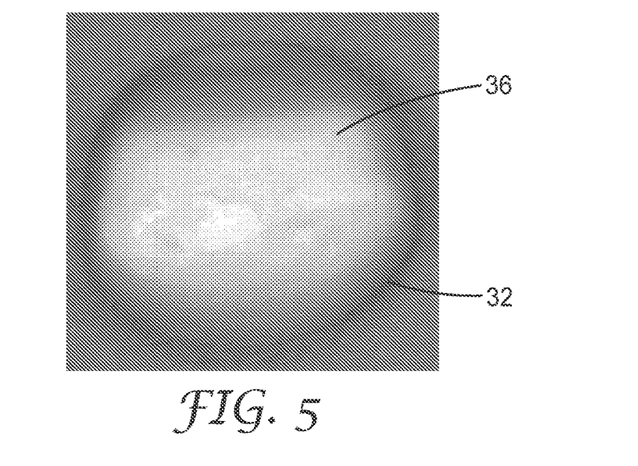
FIG. 5 is a third view of an image of a thin wall 3D printed zirconia crown.

As shown in FIGS. 3-5, the 3D printed crowns each have a wall 32 having a bottom edge 34 and an occlusal portion 36 joined with wall 32 opposite bottom edge 34. Wall 32 and occlusal portion 36 form an interior surface and opposing exterior surface.

Likewise, all of the additively manufacturable crowns described herein have a wall having a bottom edge and an occlusal portion joined with the wall opposite the bottom edge, where the wall and occlusal portion form an interior surface and an opposing exterior surface. A thinnest portion of the wall has a thickness of less than 300 microns, and the wall and occlusal portion both comprise an additively manufacturable material.

For all of the additively manufacturable crowns described herein, the wall thickness can range from 100 microns to typically 300 microns and possibly to 350 microns, and the occlusal portions typically have a thickness similar to the wall, but thickness of the occlusal portion or surface can be greater than the wall and reach up to 500 microns. The thinnest portion of the wall is typically less than 300 microns but could also be less than 350 microns as printed or otherwise additively manufactured or as in the fired or final state. The wall thickness can vary due to, for example, the features on the wall described herein.

Additively manufacturable materials for all of the crowns described herein include zirconia, alumina, lithium disilicate, porcelain and other glass and ceramic materials suitable for use in dentistry.

Restorations Featuring Retention and Adjustment Aids

While milling of undercut features for height adjustment and retention is possible, additional milling time and a fine bur is required. In contrast, additive manufacturing can create a wide range of tailored retention structures without any additional tooling or printing time. Unlike milling, 3D printing or other additive manufacturing thus offers the possibility to incorporate design features that are either costly or not possible to create in a milled crown. 3D printing also allows for economies of scale to be realized in environments were a large number of crowns are produced at the same time and where unlike milling, the printer does not require precision grinding of each surface.

Figure 6:
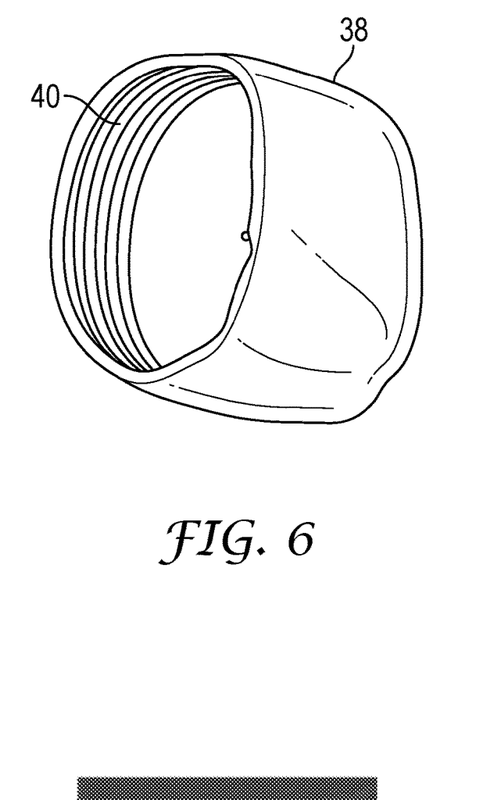
FIG. 6 is a diagram of a crown with a rib structure.
Figure 7:
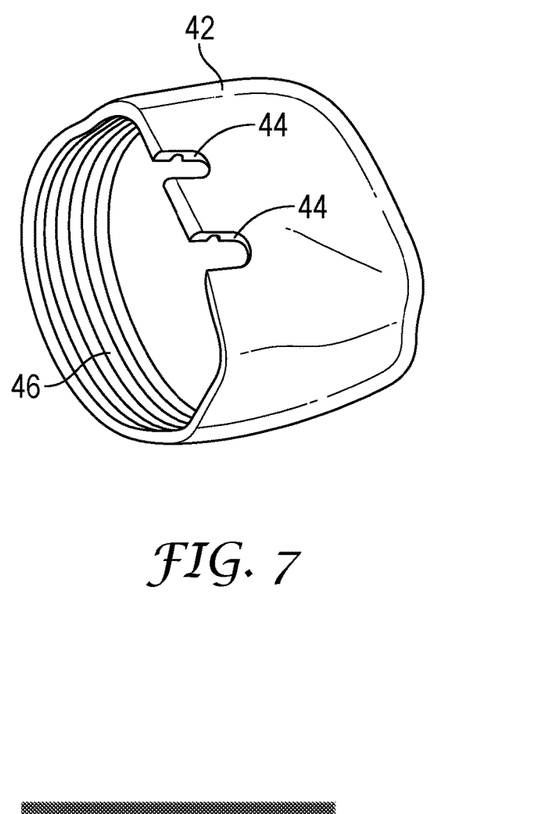
FIG. 7 is a diagram of a crown with an adjustable rib feature.
Figure 8:
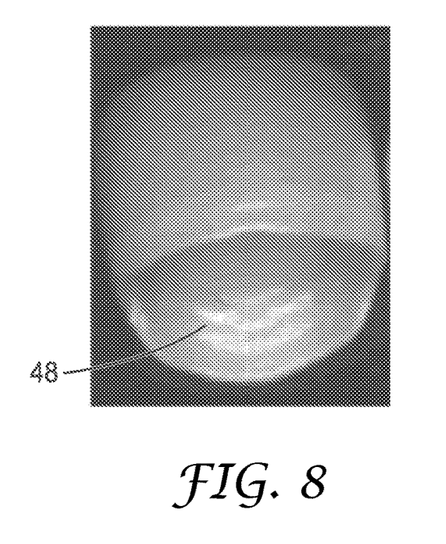
FIG. 8 is an image of a 3D printed crown with rib features.
Figure 9:
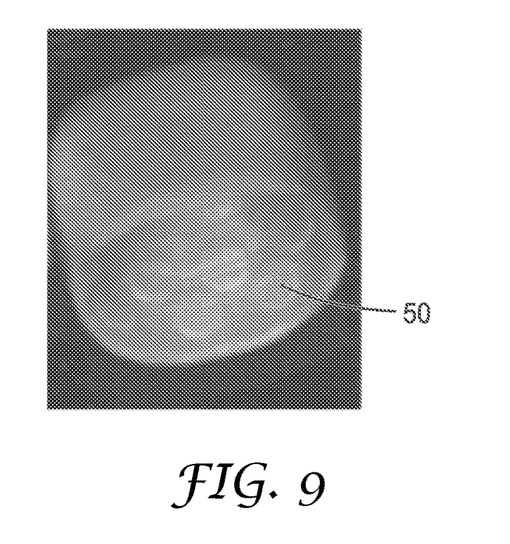
FIG. 9 is an image of a 3D printed crown with retention features.

FIGS. 6 and 7 are diagrams illustrating examples of retention features and an adjustable rib feature that makes it easier for the dentist to adjust the height of the crown chairside by notching to the desired rim and fracturing away the undesired section at the margin. FIG. 6 is a diagram of an additively manufacturable crown having rib features 40 on the interior surface of wall 38, and FIG. 7 is a diagram of an additively manufacturable crown having rib features 46 on the interior surface of wall 42 and notches 44 extending fully through wall 42 at the bottom edge. FIG. 8 is an image of a 3D printed crown with rib features, and FIG. 9 is an image of a 3D printed crown with retention features. Examples of other retention features include a scaly interior surface of the wall such as small triangular protrusions on the interior surface. Instead of or in addition to a notch, the wall can have a small hole extending fully through the wall to drain off abundant cement.

The rib features 40 and 46 are printed, or otherwise additively manufactured, receding from the inner surfaces of the walls. The rib features typically have a width along the interior surface of 250 microns, and recede from the interior surface by 150 microns. Notches 44 typically have a width of 500 microns along the bottom edge, and extend by 1000 microns along the interior surface of the wall away from the bottom edge.

Figure 10:
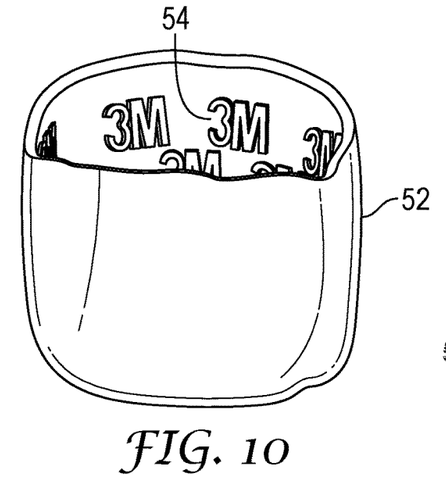
FIG. 10 is a diagram of a crown with an identification feature.
Figure 11:
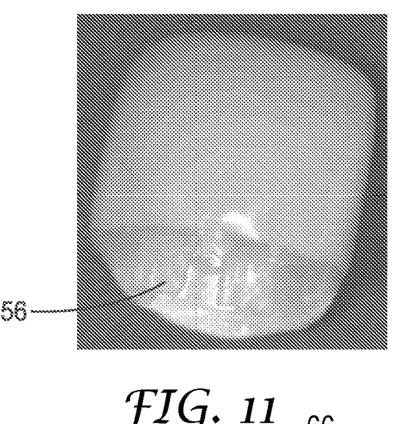
FIG. 11 is an image of a 3D printed crown with identification and branding.

The ability to print fine features can be extended into identification and branding marks and custom engineered features extending partially or fully through the crown walls, again without necessarily requiring any additional fabrication time. FIG. 10 is a diagram of an additively manufacturable crown with an identification feature 54 on an interior surface of wall 52, in this example a printed "3M" company name on the interior surface. FIG. 11 is an image of a 3D printed crown with an identification and branding feature. Additive manufacturing enables the printing of such fine features, such as company or brand names, and such features are typically printed protruding from the interior surface of the wall of a crown 100 microns and can have a dimension of 1000 microns. Tooth number, crown size, lot number, or custom crown case identification number, or any combination thereof, can be printed in a similar manner.

Figure 12:
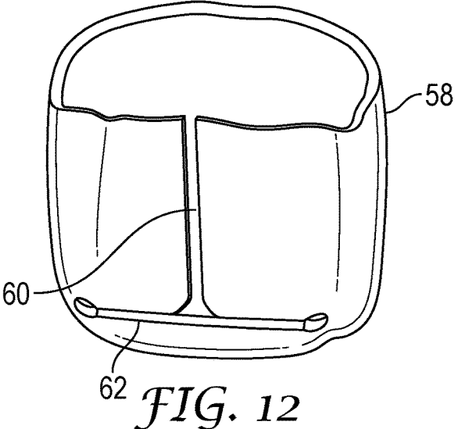
FIG. 12 is a diagram of a crown with a lingual slot.
Figure 13:
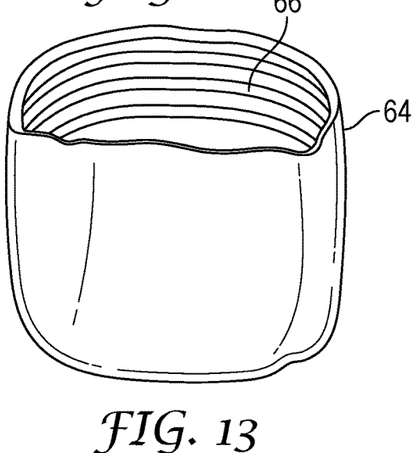
FIG. 13 is a diagram of a crown with ribs.
Figure 14:
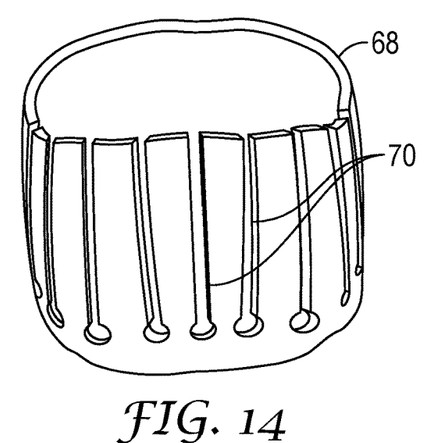
FIG. 14 is a diagram of a crown with multiple lingual slots.

FIG. 12 is a diagram of an additively manufacturable crown with a lingual slot, including combined slots 60 and 62 extending fully through wall 58. FIG. 13 is a diagram of an additively manufacturable crown with ribs 66 on an interior surface of wall 64. FIG. 14 is a diagram of an additively manufacturable crown with multiple lingual slots 70 extending fully through wall 68. Lingual slots 60, 62, and 70 are typically printed, or otherwise additively manufactured, having a width of 300 microns and a length of 4000 microns.

Restorations Featuring Enhanced Flexibility

Conventional ceramic restorations, whether patient specific or preformed, are known to be brittle and exhibit very little defection before failure. However, very thin features of ceramic can be engineered to flex as demonstrated in carefully milled thin bars of zirconia. In comparison, CAD design and 3D printing, or other additive manufacturing, can be used to create thin sections of zirconia in dental restoration designs that exhibit perceptible elastic deformation.

Figure 15:
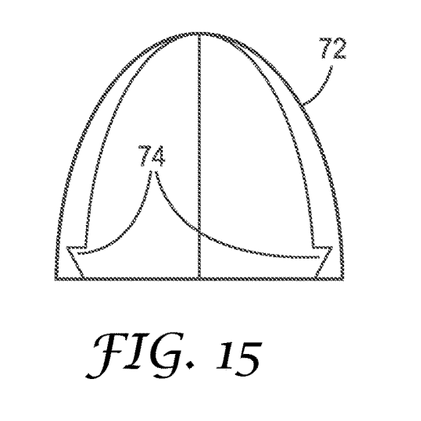
FIG. 15 is a side sectional view of a crown with cutting rib features.
Figure 16:
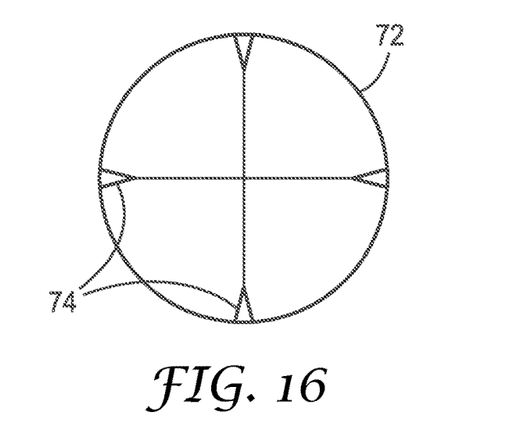
FIG. 16 is a top sectional view of the crown with cutting rib features.
Figure 17:
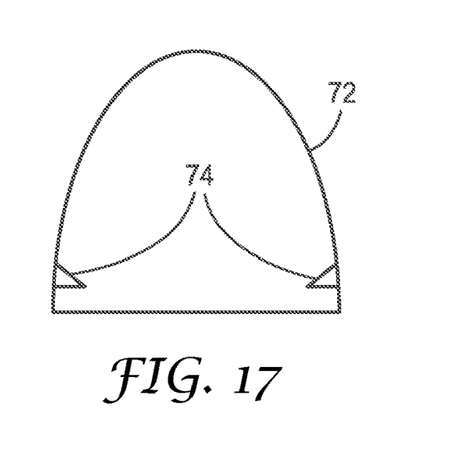
FIG. 17 is a side view of the crown with cutting rib features.
Figure 18:
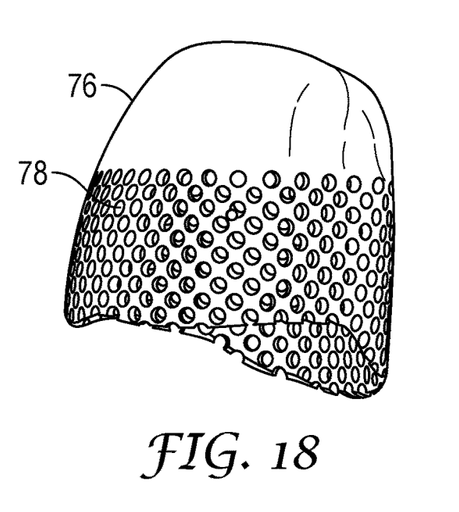
FIG. 18 is a diagram of a crown with a fine mesh feature.
Figure 19:
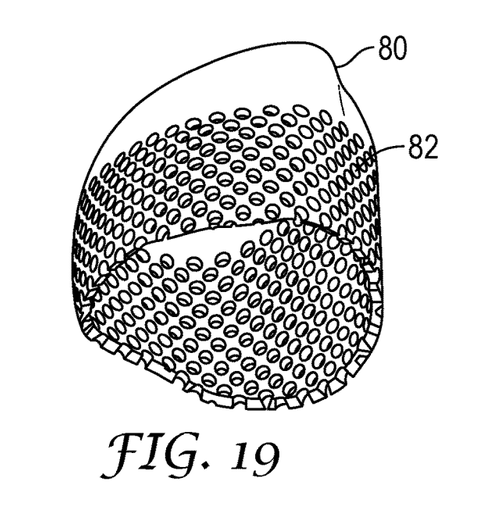
FIG. 19 is a diagram of a crown with a coarse mesh feature.
Figure 20:
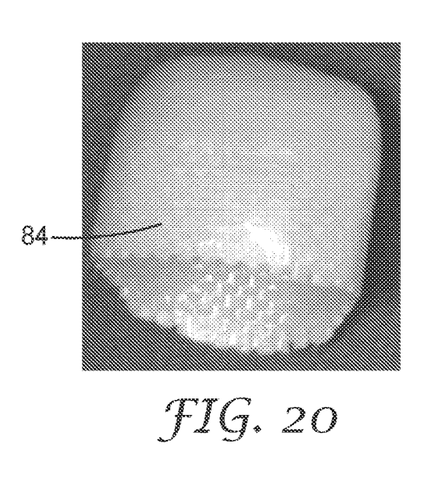
FIG. 20 is an image of a 3D printed crown with a fine mesh feature.
Figure 21:
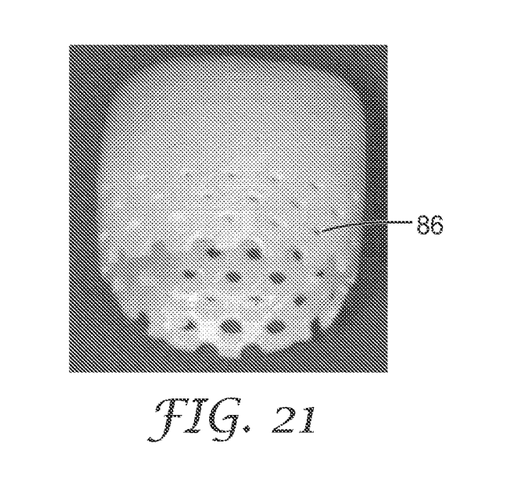
FIG. 21 is an image of a 3D printed crown with a coarse mesh feature.

Additional functional elements can also be incorporated into the restorations, such as cutting and gripping features to engage the tooth structure stump and provide additional shaping of the stump and retention. FIGS. 15-17 are side sectional, top sectional, and side views, respectively, of an additively manufacturable crown with cutting rib features 74 on an interior surface of wall 72. Cutting rib features 74 are typically printed, or otherwise additively manufactured, indenting into the interior surface of the wall and having a depth of 300 microns Geometric complexity which is printable can also be extended into a wide range of porous meshes. FIG. 18 is a diagram of an additively manufacturable crown with a fine mesh feature 78 in wall 76, and FIG. 19 is a diagram of an additively manufacturable crown with a coarse mesh feature 82 in wall 80. FIG. 20 is an image of a 3D printed crown with a fine mesh feature, and FIG. 21 is an image of a 3D printed crown with a coarse mesh feature. Mesh features 78 and 82 are typically printed, or otherwise additively manufactured, extending fully through the walls of the crowns. Fine mesh features 78 can have a pore diameter, or largest dimension, of 100 microns. Coarse mesh features 82 can have a pore diameter, or largest dimension, of 500 microns.

These mesh features can assist in adjustment. The pores can be located strategically along the gingival margin and lingual surface to maximize adaptability while minimizing effect on esthetics and strength. They can be infiltrated during the restorative process with color matching cements and luting agents. The small areas of the pores can minimize wear of the softer luting materials during clinical service. When these materials contain bioactive components, such as fluoride and calcium phosphate, the surface area for release is enhanced over solid crowns. The benefits of this feature can be extended to indications well beyond the crown shown. For example, additive manufacturing can be used to print partial tooth scaffolds that can strengthen and protect filling materials (e.g., Class V fillings restored with Glass Ionomer).

Figure 22:
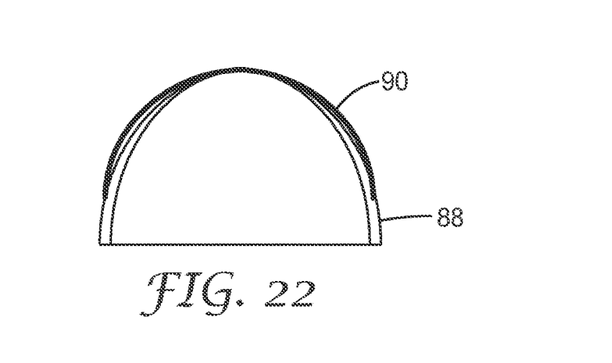
FIG. 22 is a side sectional view of a crown with concentric shells.

Alternatively, variations of concentric crown shells are possible with 3D printing or other additive manufacturing. FIG. 22 is a side sectional view of an additively manufacturable crown with concentric shells 88 and 90 forming the wall and occlusal portion. This crown shape takes advantage of the enhanced elastic flex of thin walls of zirconia, particularly in areas were some flexibility is required, such as near the crown margin. 3D printing enables thin (20 micron) walls to be printed and stacked so that a series of individual, spaced-apart laminar walls, composed of multiple layers joined together, can form the crown side wall. These walls can be designed to be mutually reinforcing such that one wall contacts and loads an adjacent wall prior to reaching a failure stress. These designs offer more compressibility when a crown in placed on a tightly fitting stump. Optionally, the occlusal surface (exterior surface of the occlusal portion of the crown) is much thicker to resist loads and abrasion during use.

Figure 23:
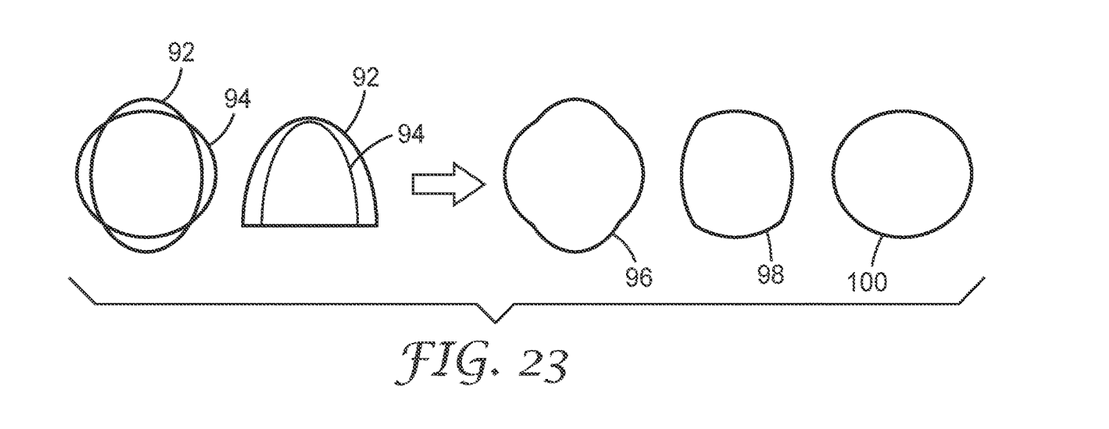
FIG. 23 is a diagram illustrating a crown with an interlocking dome feature.

Finally, the ability to create thin 3D printed zirconia, optionally with engineered features, offers the potential to create geometries which can be easily trimmed chairside to create a range of sizes. One such design is an interlocking dome construction whereby various walls can be trimmed away to create a range of crown sizes. FIG. 23 is a diagram illustrating an additively manufacturable crown with an interlocking dome including shells 92 and 94 interlocking to form a wall and an occlusal portion for the crown. The interlocking domes can be, at chairside, trimmed large (96), trimmed small (98), trimmed oval (100), or trimmed in other ways.

The following further recite embodiments of the invention.

Item 1 is an additively manufactured dental crown, comprising:
 a wall having a bottom edge; and
 an occlusal portion joined with the wall opposite the bottom edge, the wall and the occlusal portion forming an interior surface and an opposing exterior surface,
 wherein a thinnest portion of the wall has a thickness of less than 300 microns,
 wherein the wall and the occlusal portion both comprise an additively manufacturable material.

Item 2 is the dental crown of Item 1, wherein the wall includes ribs on the interior surface.

Items 3 is the dental crown of any preceding Item 1 to Item 2, wherein the wall includes notches at the bottom edge.

Item 4 is the dental crown of any preceding Item 1 to Item 3, wherein the wall includes retention features on the interior surface.

Item 5 is the dental crown of any preceding Item 1 to Item 4, wherein the wall includes a slot extending fully through the wall and joined with the bottom edge.

Item 6 is the dental crown of any preceding Item 1 to Item 5, wherein the wall includes a first slot extending fully through the wall and joined with the bottom edge, and a second slot extending fully through the wall and joined with the first slot opposite the bottom edge.

Item 7 is the dental crown of any preceding Item 1 to Item 6, wherein the wall includes cutting rib features indenting into the interior surface adjacent the bottom edge.

Item 8 is the dental crown of any preceding Item 1 to Item 7, wherein the wall includes a porous mesh.

Item 9 is the dental crown of any preceding Item 1 to Item 8, wherein the wall and the occlusal portion comprise concentric stacked shells.

Item 10 is the dental crown of any preceding Item 1 to Item 9, wherein the wall and the occlusal portion comprise interlocking domes.

Item 11 is the dental crown of any preceding Item 1 to Item 10, wherein the wall and the occlusal portion comprise zirconia.

Item 12 is a method for making a dental crown, comprising steps of:
 receiving a design for a dental crown, comprising:
 a wall having a bottom edge; and
 an occlusal portion joined with the wall opposite the bottom edge, the wall and the occlusal portion forming an interior surface and an opposing exterior surface,
 wherein a thinnest portion of the wall has a thickness of less than 300 microns,
 wherein the wall and the occlusal portion both comprise an additively manufacturable material; and
 making the dental crown using additive manufacturing.

Item 13 is the method of Item 12, further comprising sintering the dental crown after making the dental crown using the additive manufacturing.

Item 14 is the method of any preceding Item 12 to Item 13, wherein the making step comprises making the dental crown using a 3D printer.

Item 15 is the method of any preceding Item 12 to Item 14, wherein the receiving step includes receiving the design wherein the wall includes ribs on the interior surface.

Item 16 is the method of any preceding Item 12 to Item 15, wherein the receiving step includes receiving the design wherein the wall includes notches at the bottom edge.

Item 17 is the method of any preceding Item 12 to Item 16, wherein the receiving step includes receiving the design wherein the wall includes retention features on the interior surface.

Item 18 is the method of any preceding Item 12 to Item 17, wherein the receiving step includes receiving the design wherein the wall includes a slot extending fully through the wall and joined with the bottom edge.

Item 19 is the method of any preceding Item 12 to Item 18, wherein the receiving step includes receiving the design wherein the wall includes cutting rib features indenting into the interior surface adjacent the bottom edge.

Item 20 is the method of any preceding Item 12 to Item 19, wherein the receiving step includes receiving the design wherein the wall includes a porous mesh.

The invention claimed is:

1. A method for making a dental crown, comprising steps of:
 receiving a design for a dental crown, comprising:
 a wall having a bottom edge; and
 an occlusal portion joined with the wall opposite the bottom edge, the wall and the occlusal portion forming an interior surface and an opposing exterior surface,
 wherein the wall and the occlusal portion both comprise an additively manufacturable material,
 wherein the wall includes at least one of a) a retention feature; b) an identification feature on the interior surface and c) a porous mesh, wherein the retention feature comprises a circumferential rib feature receding from the interior surface of the wall, and the identification feature comprises at least one of a tooth number, a crown size, a lot number, or a custom crown case identification number, and wherein the porous mesh comprises pores located along a gingival margin of the wall; and making the dental crown as a single piece from a zirconia sol using additive manufacturing, wherein a thinnest portion of the additively manufactured wall has a thickness of less than 300 microns.

2. The method of claim 1, wherein the receiving step includes receiving the design wherein the wall includes the identification feature and the identification feature protrudes from the interior surface of the wall 100 microns.

3. The method of claim 1, wherein the receiving step includes receiving the design wherein the wall includes the identification feature and the identification feature has a dimension of 1000 microns.

4. The method of claim 1, wherein the receiving step includes receiving the design wherein the wall includes the identification feature and the identification feature comprises a company name.

5. The method of claim 1, wherein the receiving step includes receiving the design wherein the wall includes the rib feature and wherein the wall is fracturable at the rib feature in order to adjust a height of the crown.

6. The method of claim 1, wherein the wall includes the porous mesh.

7. The method of claim 1, wherein the receiving step includes receiving the design wherein the wall includes the retention feature and the rib feature has a width along the interior surface of the wall of at least 250 microns.

8. The method of claim 1, wherein the receiving step includes receiving the design wherein the wall includes the retention feature and the rib feature recedes from the interior surface of the wall by at least 150 microns.

9. The method of claim 1, wherein the wall includes the porous mesh and wherein the pores have a largest dimension of 100 microns.

10. The method of claim 1, wherein the wall includes the porous mesh and wherein the pores have a largest dimension of 500 microns.

11. The method of claim 1, wherein the wall includes the porous mesh and wherein the pores extend through the full thickness of the wall.

12. The method of claim 1, wherein the receiving step includes receiving the design wherein the wall includes the retention feature and the retention feature comprises multiple circumferential rib features receding from the interior surface of the wall.

13. The method of claim 12, wherein the receiving step includes receiving the design wherein the wall is fracturable at each of the multiple rib features in order to adjust a height of the crown.

14. The method of claim 1, wherein the receiving step includes receiving the design wherein the wall includes notches extending fully through the wall at the bottom edge.

15. The method of claim 14, wherein the receiving step includes receiving the design wherein the notches have a width of at least 500 microns along the bottom edge.

16. The method of claim 14, wherein the receiving step includes receiving the design wherein the notches extend by at least 1000 microns along the interior surface of the wall away from the bottom edge.

* * * * *